TUNNEL DIODE LEVEL SHIFT GATE DATA STORAGE DEVICE

Filed March 14, 1963

| CLOCK | 00 | 01 | 11 | 10 |
|---|---|---|---|---|
| 0 | 0 | 1 | 1 | 0 |
| 1 | 1 | 1 | 0 | 0 |

INVENTORS
DAVID H. CHUNG
DANIEL W. MURPHY

BY Joseph C. Redmond, Jr.
ATTORNEY 3,248,568

TUNNEL DIODE LEVEL SHIFT GATE DATA STORAGE DEVICE

David H. Chung, Poughkeepsie, and Daniel W. Murphy, Wappingers Falls, N.Y., assignors to International Business Machines Corporation, New York, N.Y., a corporation of New York Filed Mar. 14, 1963, Ser. No. 265,210
12 Claims. (Cl. 307—88.5)

This invention relates to switching circuits and, more particularly, to switching circuits adapted for data storage, logic or like operation.

Information handling systems are justified, in part at least, by the number of decisions that can be executed in an arbitrarily selected unit of time. As the number of decisions executed in a selected interval time increases, the system is capable of more complex and extended data processing which makes such systems more useful to the business, scientific and governmental communities. One factor affecting the number of decisions executed in a selected time interval is the signal delay associated with the logic circuits included in the system. The logic circuits take the form of triggers, oscillators and gates. A prodigious number of such circuits are included in the ordinary information handling system. Manifestly, reducing the number of circuit elements, improving the circuit response and lowering the data signal power requirements will increase the number of decisions executed in a selected interval of time. It is desirable, therefore, to improve logic circuit operation with respect to switching time, signal response, number of circuit elements and reliability of operation thereby to increase the flexibility, versatility and capability of information handling systems.

A general object of the invention is a data storage circuit suitable for use in information handling systems requiring logical elements with signal delays not exceeding three nanoseconds.

One object is a trigger circut having a reduced number of inputs, few active elements and rapid switching speed.

Another object is a trigger circuit which does not require a feedback circuit.

Another object is a trigger circuit that does not require set or reset circuits.

Still another object is a trigger responsive to low power input signals.

These and other objects are accomplished in accordance with the present invention, one illustrative embodiment of which comprises one or more bistable semiconductor devices, typically tunnel diodes, connected in series aiding relation between first and second voltage supplies of opposite polarities. A load circuit, including an impedance connected in series with a voltage supply, is coupled to the common connection between the bistable devices. First and second current paths are also connected to the common connection, each current path including an asymmetrical impedance for passing current in a particular direction. A clock circuit is coupled to the first and second current paths to supply signals of unlike polarity to the respective current paths. An input circuit is suitably connected to the current paths and an output circuit is connected to the load circuit. The load circuit arranges the bistable devices for bistable operation. Each operating condition is indicative of a discrete information condition. The current paths adjust the bistable operating points when a clock signal is present. The simultaneous presence of a clock signal and an input signal of one information condition will switch the operating condition of the bistable devices when in the other information condition. During the absence of a clock signal, the operating condition of the bistable devices is not changed even though input signals appear from time to time. The current paths do not require any current from the load during this interval. When the necessary signals are present to switch the bistable devices, the operating point is adjusted to be adjacent to the negative resistance characteristic of the devices thereby increasing the switching speed. The current paths adjust the switching operation of the bistable devices to occur at the leading edge of the clock pulse. Thus, the trigger circuit is rapid in switching operation, has only two inputs, namely, a data and clock input, and is absent a feedback circuit between the output and input circuits for causing the necessary degenerative operation to hold the bistable devices in a particular information storage condition.

One feature of the invention is one or more bistable devices adapted to be set in a first or second signal condition according to a data signal and a clock signal.

Another feature is one or more bistable devices having a first and second storage condition and first and second current paths suitably connected to the devices, a current path being selected to pass current in accordance with the storage condition of the bistable devices, a clock signal and a data signal thereby to establish a bistable device in a storage condition in accordance with a trigger circuit truth table.

Still another feature is a pair of tunnel diodes having a bistable load line which is adjusted to a different position according to first and second current paths, said first and second current paths responsive to a gating signal and an input signal and the storage condition of the bistable devices to pass current in a manner which will adjust the storage condition in accordance with a trigger truth table.

The foregoing and other objects, features and advantages of the invention will be apparent from the following more particular description of the preferred embodiments of the invention illustrated in the accompanying drawings.

Figures 1, 2, 4:
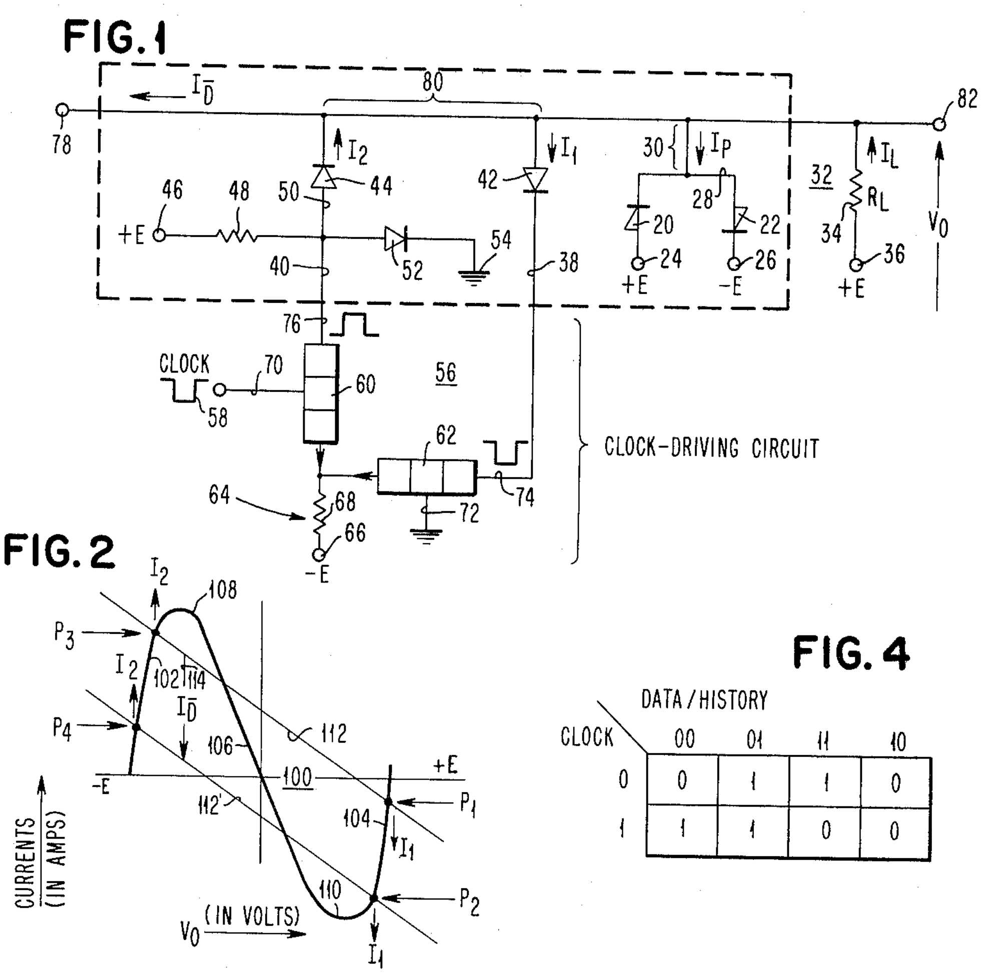
FIGURE 1 is an electrical schematic of a circuit employing the principles of the present invention.
FIGURE 2 is a current-voltage plot of the bistable devices included in the circuit of FIGURE 1.
FIGURE 4 is a truth table depicting operation of the embodiment shown in FIGURE 1.

Referring to FIGURE 1, a pair of bistable semiconductor devices 20 and 22 are connected in series aiding relation between voltage supplies 24 and 26 of opposite polarities. Coupling the devices together is a common connection 28 which includes a node 30 to which is connected a load circuit 32 including a series impedance 34 and a voltage supply 36. Also connected to the node 30 is a first current path 38 and a second current path 40. The current paths 38 and 40 include diodes 42 and 44 poled in opposite directions, the diode 44 conducting current toward the node 30 and the diode 42 conducting current away from the node 30. The current path 40 has a voltage supply 46 and series impedance 48 connected to cathode 50 of the diode 44. Also connected to the cathode 50 is a diode 52 arranged for clamping the cathode 50 to a source of reference potential 54. The current paths 38 and 40 are connected to a bipolar clock circuit 56, the circuit being adapted to provide signals of unlike polarity to each current path in response to a single clock signal 58. One form of clock circuit is a current switch comprising a first transistor 60 and a second transistor 62, the transistors being emitter coupled to a current supply 64 including a source of voltage 66 and a series resistor 68. The source of clock signals 58 is connected to base electrode 70 of the transistor 60. The base electrode 72 of the transistor 62 is connected to the source of reference potential. Collector electrodes 74 and 76 are directly connected to the current paths 38 and 40, respectively. Completing the invention is a data input circuit 78 connected to node 80 which is the common junction of the current paths 38 and 40, node 80 being directly and conductively connected to node 30. An output circuit 82 is connected to the end of the load circuit 32 coupled to the node 30.

The bistable devices employed in the present invention exist in the art in several forms. One eminently satisfactory device is a tunnel diode described in an article entitled, "New Phenomenon and Narrow Germanium PN Junctions," Physical Review, volume 109, 1958, pages 603 and 604 of L. Esaki. The tunnel diode has been selected for use in the present invention as a preferred element because of its extreme speed of response. Accordingly, the remaining paragraphs of the description will be limited to circuits employing the characteristics of the tunnel diode, but it should be understood that other bistable devices such as double-based diodes may be employed in the present invention with satisfactory results.

Referring to FIGURE 2, a composite characteristic 100 is given for the devices 20 and 22 at the node 30. The composite curve is constructed in accordance with the procedure outlined in the text "Handbook of Semiconductor Electronics," edited by L. P. Hunter, second edition, McGraw-Hill Book Company, Inc., New York, New York, 1962, section 18. The composite curve 100 has a first positive resistance section 102 and a second positive resistance section 104. Interconnecting the positive resistance sections 102 and 104 is a negative resistance section 106. The composite curve 100 also includes a peak current point 108 and a valley current point 110. The load 32 establishes an operating curve 112 which intersects the composite curve 100 at stable operating points P1 and P3. The basis for the load 32 establishing operating points P1 and P2 is also described in the "Handbook of Semiconductor Electronics," previously mentioned, or other well-known electrical engineering texts. The current appearing at input terminal 78 (see FIGURE 1), tends to add to or subtract from that provided by the load. The absence of input current shifts the load line to a new position indicated by load line 112'. The vertical separation between load lines 112 and 112' indicated by reference character 114, is the magnitude of $I_D$ the input current necessary to shift the load line to the position 112'. Load line 112' establishes new stable operating points P2 and P4. When the clock circuit is energized, currents $I_1$ or $I_2$ will be developed to switch the operating states of the composite devices, provided the devices are at the proper operating points. The currents $I_1$ and $I_2$ appear in FIGURE 1. When the composite devices are at operating points P3 and P4, the current $I_2$ flows. When the composite devices are at operating points P1 or P2, the current $I_1$ flows. The devices will switch when at operating points P3 or P2 and currents $I_2$ or $I_1$ flow, respectively. The devices will not switch when operated at the operating points P1 and P4 and the currents $I_1$ and $I_2$, respectively, appear. The magnitudes of the currents $I_1$ and $I_2$ at the later points are insufficient to permit the load line to be shifted above or below the peak and valley points, respectively. Before discussing the detailed operation of the circuit, it is now believed in order to describe how the currents $I_1$ and $I_2$ are developed.

Returning to FIGURE 1, the currents $I_1$ and $I_2$ flow in accordance with the input signal appearing at terminal 78; the storage condition of the devices 20 and 22 and the presence of a clock pulse 58. The diodes 42 and 44 are either forward or reverse biased in accordance with the particular voltage conditions appearing in the circuit. When the devices 20 and 22 are in a low voltage condition, the diode 42 is reverse biased and the diode 44 is forward biased. Accordingly, the current $I_2$ flows in the current path 40. When the devices 20 and 22 are in the high voltage condition, the diode 44 is reverse biased and the diode 42 is forward biased. Accordingly, current flows in the current path 38. It will be noted that the current $I_2$ is toward the node 30 and the current $I_1$ is away from the node 30. In the absence of a clock pulse, the collector potential at the transistors 60 and 62 is such as to reverse bias the diodes 42 and 44 thereby to prevent current flow in the current path. Thus, normally, no current drain occurs on the load 32 as a result of the current paths 38 and 40. The appearance of a clock pulse permits current to flow in the appropriate current path according to the previous storage condition of the devices 20 and 22. When the devices are in a low voltage condition, the current $I_2$ flows. When the devices are in a high voltage condition, the current $I_1$ flows. The current $I_1$ or $I_2$ combines with the input current at terminal 78 to establish the proper operating points for the devices 20 and 22.

Turning now to FIGURE 2, the devices 20 and 22 will be arbitrarily assumed as being at operating point P3. The simultaneous presence of a clock pulse and an input signal at terminal 78 will cause the current $I_2$ to flow which will switch the devices from the operating point P3 to the operating point P1. If the devices were at operating point P4, the presence of the clock pulse and the absence of an input signal would adjust the operating point P4 to a position intermediate operating points P3 and P4 due to the presence of the current $I_2$. The adjusted operating point is not beyond the peak 108 so that the devices will not switch to the high voltage condition. Accordingly, upon release of the clock pulse, the devices will assume operating point P4. The appearance of a data pulse, however, would re-establish operation at operating point P4. In any event, the devices only switch to the high voltage condition when the data pulse is present and the clock signal appears.

When the devices 20 and 22 are in the high voltage condition, the operation of the devices is at operating point P2 during the absence of the data signal or P1 during the presence of the data signal. The appearance of a gate signal, when the data signal is absent, develops the current $I_1$, which is sufficient to switch the devices from the operating point P2 to the operating point P4. The appearance of a gate signal, when the data signal is present develops the current $I_1$. The $I_1$ current does not shift the operating point beyond the valley 110 so that operation remains in the high voltage condition, the final operating point being depedendent upon the presence or absence of the data signal when the gate signal is removed. If the data signal is present, the operating point is at P2. If the data signal is absenst, the operating point is at P1.

Since the currents $I_1$ and $I_2$ do not flow during the absence of the clock pulse, it will be apparent that changes in the data signal will not affect the storage condition of the devices 20 and 22. When the device is readied for switching, however, it will be noted that the operating point is adjacent to the peak 108 and valley 110 operating points. Thus, the amount of power required by the clock circuit is minimal to switch the devices to the opposite operating states. Additionally, the speed of switching is rapid since the switching occurs in the negative resistance region 106 wherein the devices have the fastest operating speed.

Figure 3:
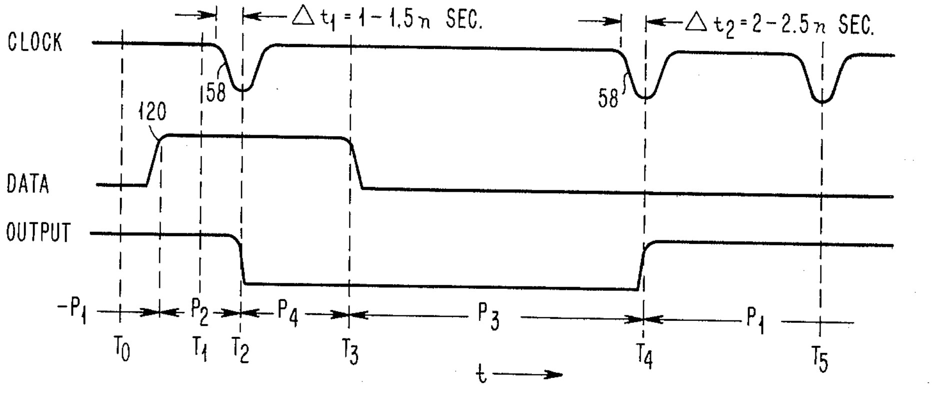
FIGURE 3 is a timing diagram of input signals and output signals for the circuit of FIGURE 1.

Referring to FIGURE 3, operation of the circuit is described for clock pulses 58, input or data signals 120 and output signals at times T0, T1, T2, T3, T4 and T5. At time T0, clock pulse and data pulses are absent and the devices 20 and 22 are in a high voltage condition (P1, see FIG. 2), as indicated in the lower section of FIGURE 3. A data signal 120 at time T1 does not affect the output voltage since the clock pulse is absent. The data signal, however, adjusts the bistable devices to operating point P2. The absence of the clock pulse prevents the current $I_1$ from flowing to switch the device. The presence of clock pulse 58 and data pulse 120 at time T2 changes the output voltage to the low voltage state. The data pulse 120 establishes device operation at P2 (see FIG. 2). The clock pulse develops current $I_1$ which is sufficient to switch the devices to operating point P4, a low voltage condition. The removal of the data pulse at time T3 adjusts the operating point to P3. No change occurs in the output voltage as indicated in the lower section. The absence of the clock pulse prevents the current $I_2$ from flowing which otherwise would switch the devices to the high voltage condition. The presence of the clock pulse 58 and the absence of a data pulse at time T4 establish operation at the operating point P1. The current $I_2$ developed is sufficient to switch the devices to the high voltage operating condition. When the clock pulse is removed, the devices remain at the operating point P2. The reappearance of the clock pulse and the absence of the data pulse adjust the operating point to a position between P1 and P2 due to the current $I_1$ flowing. The devices, however, do not change voltage state. On release of the gate pulse, operation is restored at P1. When the data signal is returned, the operation indicated for times T1 and T2 is repeated.

Thus, it will be seen that the trigger circuit operates in the manner described in the truth table shown in FIGURE 4. The binary representations inside the table are the circuit outputs for the indicated input condition. The clock inputs are shown by the row designations. The input or data signal and device storage conditions are shown by the columnar headings. FIG. 4 is a Karnaugh map of the logic function performed by the present invention. The logic function may be written as $F=\overline{C}H+C\overline{D}$ where C is the clock signal; $\overline{C}$ is the absence of the clock signal; $\overline{D}$ is the absence of a signal from the signal means and H is the first stable operating condition of the devices. A detailed explanation of logic function derived from Karnaugh maps is given in the text "Switching Circuits and Logic Design" by S. H. Caldwell, John Wiley & Sons, New York, N.Y., 2nd printing 1959, pp. 132–142.

It will be noted from FIGURE 3 that the circuit switches on the leading edge of the gate pulse. This feature in combination with the switching position being adjacent to the device negative resistance region permits the storage condition to be changed in one to three nanoseconds. Contributing to this rapid switching operation is the reduced number of active elements in the circuit. Essentially, the circuit comprises a pair of bistable devices and two conventional diodes. The diode 52 is used for clamping purposes to insure the proper voltage is present for operating the diode 42. The clock circuit may be any phase splitting network and is not restricted to the indicated configuration. As one modification, a conventional diode may be substituted for the transistor 62. Moreover, one clock driving circuit may be used to trigger several circuits of the present type. Also aiding the switching speed is the elimination of a feedback circuit between input terminal 78 and output terminal 82. Such feedback lines are no more than delay devices and increase the total switching time of the circuit. Further, the elimination of the feedback circuit reduces the power drain required on the supplies 24, 26 and 36. The current paths 38 and 40, as previously indicated, do not require any power during the absence of a clock signal and the amount of power during the clock signal is minimal since the switching point is adjusted near the peak or valley of the composite curve. Also, the absence of a set and reset circuit required in conventional triggers eliminates further power drain which permits the present invention to be fabricated in integrated circuit technology.

The circuit may be adapted for binary trigger operation by removal of the input at terminal 78 and suitable adjustment of the currents $I_1$ and $I_2$. The omission of a data signal eliminates the load line 112'. To switch the device, the clock pulse should develop current $I_2$ and a current of magnitude $I_D$, see FIGURE 2. When changes of this type are entered, the devices 20 and 22 will switch from one state to another each time a clock pulse is received.

Thus, the present invention has disclosed a data storage circuit which is suitable for use in high speed information handling systems. The switching delay is of the order of a few nanoseconds which complies with the requirements of present systems. Further, the few active elements, reduced number of input circuits and rapid low power requirements provide a device which is reliable in operation, simple in construction and inexpensive in cost.

While the invention has been particularly shown or described with reference to preferred embodiments thereof, it will be understood by those skilled in the art that the foregoing changes in form and details may be made therein without departing from the spirit and scope of the invention.

What is claimed is:

1. A switching circuit comprising
a pair of two terminal negative resistance semiconductor devices,
biasing means connected to the devices, said biasing means adapted to operate both devices in one of two stable operating conditions,
a plurality of current paths all connected to the devices at the same point,
signal means connected to the current paths and adapted to adjust the operating conditions of the devices without altering the stable operating condition thereof, and
bipolar pulse means connected to the current paths, said pulse means in combination with the signal means adapted to change both devices from the one stable condition to the other stable condition according to the operating condition of the devices at the time the signal means and pulse means become active.

2. A switching circuit comprising
a pair of two terminal negative resistance semiconductor devices connected in series aiding relation,
biasing means connected to the devices, said biasing means adapted to operate both devices in one of two operating conditions,
first and second current paths connected to the devices,
pulse means connected to the current paths, said pulse means developing current flow in one or the other current path according to the stable operating condition of the devices, and
signal means connected to the current paths, said signal means in combination with the current flowing in the conducting current path adapted to change the stable operating condition of both devices according to the operating condition of the devices at the time the signal means and pulse means become active.

3. A switching circuit comprising
a pair of two terminal negative resistance semiconductor devices, said devices having a common junction therebetween,
biasing means connected to the devices, said biasing means adapted to operate both devices in one of two stable operating conditions,
a plurality of current paths directly connected to the common junction of the devices,
signal means connected to the current paths and adapted to adjust the operating condition of the devices without altering the stable operating condition thereof, and
bipolar pulse means connected to the current paths for supplying current to or carrying current away from the devices according to the stable operating condition thereof, said pulse means in combination with the signal means adapted to change the stable operating condition of both devices.

4. A switching circuit comprising
a pair of two terminal negative resistance semiconductor devices having a common junction therebetween,
biasing means connected to the devices, said biasing means adapted to operate both devices in one of two stable operating conditions,
first and second current paths directly connected to the common junction of the devices, each current path including an asymmetrical impedance for conducting current in a preselected direction with respect to the common junction,
signal means connected to the current paths and adapted to adjust the operating condition of the devices without altering the stable operating condition thereof, and
clock circuit means connected to the current paths, said clock circuit means in combination with the signal means adapted to change the stable operating condition of both devices, said clock circuit means reverse biasing the asymmetrical impedance for a preselected signal polarity supplied to the signal means.

5. A switching circuit comprising
a pair of two terminal negative resistance semiconductor devices having a common junction,
biasing means connected to the devices, said biasing means adapted to operate both devices in one of two stable operating conditions,
first and second current paths connected to the common junction of the bistable devices, each current path including an asymmetrical impedance, the asymmetrical impedances adapted to produce current flow in different directions with respect to the common junction,
signal means connected to the current paths and adapted to adjust the operating condition of the devices without altering the stable operating condition thereof, and
clock circuit means connected to the current paths, said clock circuit means, for a first signal condition, adapted to provide signals of unlike polarity to each current path, said clock circuit means in combination with the signal means adapted to change the operating condition of both devices, said clock circuit means, for a second signal condition, reverse biasing the asymmetrical impedances.

6. A switching circuit comprising
a pair of two terminal negative resistance semiconductor devices having a common junction,
biasing means connected to the devices, said biasing means adapted to operate both devices in one or two stable operating conditions,
first and second current paths directly connected to the common junction, each current path including an asymmetrical impedance, each current path further adapted to conduct current in different directions with respect to the common junction,
signal means connected to the current paths and adapted to adjust the operating condition of both devices by the absence of an input signal, and
clock circuit means responsive to a clock signal connected to the current paths, said clock circuit means adapted to develop a first current toward the common junction in the first current path when the devices are in one stable operating condition, said clock circuit means further adapted to develop a second current in the other current path when the devices are in the second operating condition, the second current being away from the common junction, the input signal and clock signal cooperating to change the stable operating condition of both devices, said clock circuit reverse biasing the asymmetrical impedance during the absence of the clock signal.

7. A switching circuit comprising
a pair of bistable two terminal negative resistance semiconductor devices connected in series aiding relation and having a common junction therebetween,
biasing means connected to the devices,
said biasing means adapted to operate both devices in one of two stable operating conditions,
first and second current paths connected to the common junction of the bistable devices,
signal means connected to the current paths and adapted to adjust the operating conditions of both devices without altering the stable operating condition thereof, and
pulse means connected to the current paths to supply current to or take current away from the devices according to their stable operating condition, the devices changing state when the signal means are active and the devices are in the first stable operating condition, said devices also changing state when the signal means are inactive and the devices are in the other stable operating condition.

8. The switching circuit defined in claim 7 wherein the logic function $F=\overline{C}H+C\overline{D}$ is performed where C is the clock signal; $\overline{C}$ is the absence of the clock signal; $\overline{D}$ is the absence of a signal from the signal means, and H is the first stable operating condition of the devices.

9. The switching circuit defined in claim 8 further including an output circuit connected to the common junction of the devices and providing an output signal which is sustained for a period of time corresponding to the interval between two consecutive clock pulses.

10. The switching circuit defined in claim 7 wherein the pulse means is a phase-splitting network.

11. A switching circuit comprising
a pair of two terminal negative resistance semiconductor devices connected in series aiding relation and having a common junction therebetween,
biasing means connected to the devices,
said biasing means adapted to operate both devices in a first or second operating condition,
first and second current paths connected to the common junction of the devices, each current path including an asymmetrical impedance,
a current switch connected to the current paths, said current switch responsive to a clock signal,
data signal means connected to the current paths and adapted to adjust both devices to a third or fourth operating condition without changing their stable operating condition, and
an output circuit connected to the common junction of the devices whereby a clock signal changes the conducting condition of the current switch to supply current to the devices or take current away from the devices according to the data signal and the stable operating condition of the devices.

12. The switching circuit defined in claim 11 further including clamp means for limiting the current supplied to the devices by the current switch.

References Cited by the Examiner

UNITED STATES PATENTS

| | | | |
|---|---|---|---|
| 3,031,588 | 4/1962 | Hilsenrath | 307—88.5 |
| 3,056,048 | 9/1962 | McGrogan | 307—88.5 |
| 3,069,564 | 12/1962 | DeLange | 307—88.5 |
| 3,103,597 | 9/1963 | Novick et al. | 307—88.5 |
| 3,171,981 | 3/1965 | Wolterman | 307—88.5 |
| 3,173,021 | 3/1965 | Bergman | 307—88.5 |

OTHER REFERENCES

IBM Technical Disclosure Bulletin, vol. 4, No. 12, May 1962.

Univ. of Ill. Grad. Coll., Dig. Computer Lab., Report No. 102, Applns. of Tunnel Diodes by Kunihiro, Oct. 26, 1960, pp. 48, 49–55.

ARTHUR GAUSS, *Primary Examiner.*